L. Heywood.
Bending Wood.
№ 72,293. Patented Dec. 17, 1867.
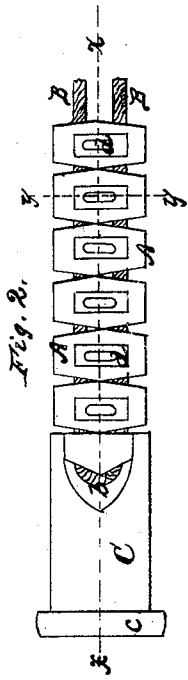
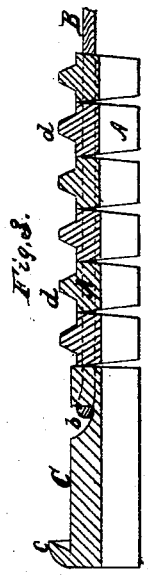
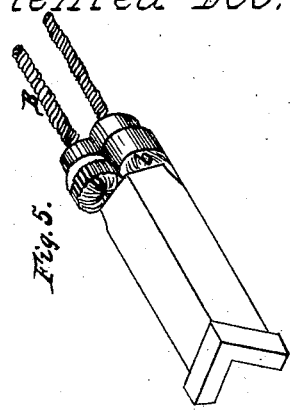
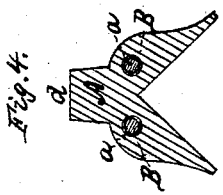
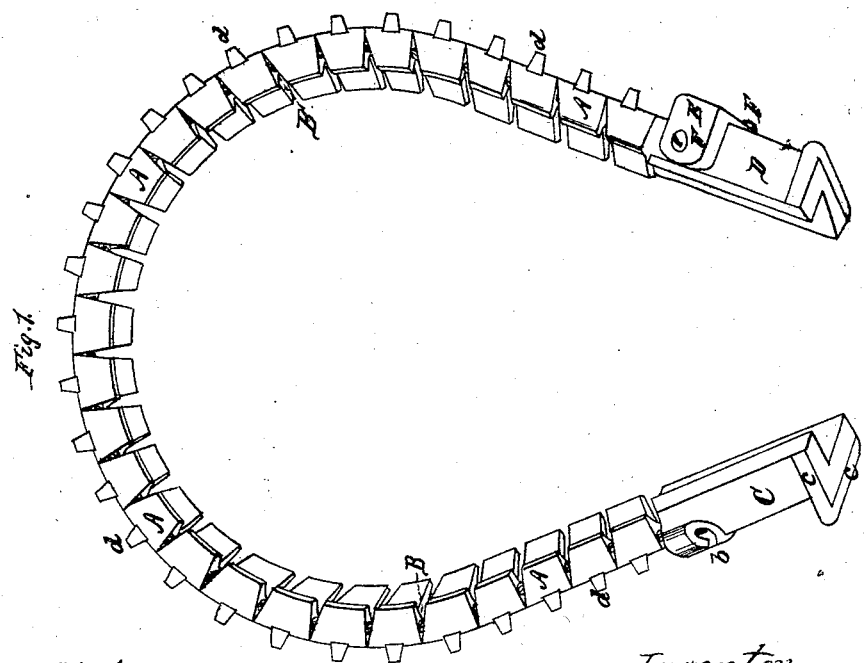
Witnesses.
Edward P. Burgess.
Fred D. Williams.
Inventor:
Levi Heywood
P. his Attorneys
Teschemacher & Stearns.

UNITED STATES PATENT OFFICE.

LEVI HEYWOOD, OF GARDNER, MASSACHUSETTS.

IMPROVEMENT IN MACHINES FOR BENDING WOOD.

Specification forming part of Letters Patent No. 72,293, dated December 17, 1867.

*To all whom it may concern:*

Be it known that I, LEVI HEYWOOD, of Gardner, in the county of Worcester and State of Massachusetts, have invented an Improved Chain for Bending Wood, of which the following is a full, clear, and exact description, reference being had to the accompanying drawings, making part of this specification, in which—

Figure 1 is a perspective view of my improved chain. Fig. 2 is a plan of a portion of the outer side of the same. Fig. 3 is a vertical section on the line $x\,x$ of Fig. 2. Fig. 4 is a transverse section on the line $y\,y$ of Fig. 2, (enlarged;) Fig. 5, modification to be referred to.

My invention relates particularly to certain improvements in chains for bending timber for which Letters Patent of the United States were granted to me on the 13th day of March, A. D. 1860; and my invention consists in one or more wires or wire ropes, which pass through and connect all of the links or sections of which the chain is composed, thus rendering it exceedingly flexible, and allowing it to be bent around and twisted into any required form, in a ready and convenient manner; and, in connection with the above, my invention also consists in providing each of the sections or links of the chain with a projection or recess at its back, into which engage the cogs of the wheel, by which the timber is bent around so as to conform to the shape of its mold, as required.

To enable others skilled in the art to understand and use my invention, I will proceed to describe the manner in which I have carried it out.

In Fig. 1 is represented my improved chain for bending wood, the links A of which are made in the form shown in section, Fig. 4, and are provided with holes $a$, (one at each side of the center,) for the reception of a wire rope, B, of slightly smaller diameter, to allow the links to play freely in a lateral or longitudinal direction thereon, thereby causing the chain to possess greater flexibility, and allow it to be bent around and twisted as required.

The line passing through the centers of the holes $a$ should be tangent to the outer surface of the timber to be bent, in order to prevent the elongation of the outer fibers.

The bight $b$ of the rope is turned around within and secured to the upper end of a metal plate, C, the two sides of which are formed at right angles to each other, with their lower edges provided with beveled projections $c$, over which the screw-clamps are fastened when the timber is being bent within its mold. The two extremities of the rope, after passing through their respective holes in the links, are fastened within grooves, half of each of which is formed in a plate, D, (similar to that C,) while its other half is formed in a plate or saddle, E, clamped to the plate D by screws F.

On the back of each link is formed a projection or cog, $d$, with which engages the cog-wheel by which the timber is bent, by which means the fibers of the timber are gradually upset, and it is made to snugly fit its mold, when, after having remained therein sufficiently long to become permanently fixed in the required position, it is removed therefrom.

In case the chain is to be subjected to a considerable strain, two wire ropes may be employed, the extremities of each being spread out or untwisted and filled around and covered with solder, as seen in Fig. 5, the holes $a$ in the plate D, through which the extremities pass, being made flaring outward at 6, to allow of this being done in such a manner as to prevent them from being drawn through.

In the foregoing description I have spoken only of a wire or wire rope; but it is evident that a strip or strap of metal, or rope of any other suitable material, may be employed; and, if preferred, the backs of the links A of the chain may be provided with recesses instead of cogs $d$, for the reception of the cogs of the wheel, (above referred to as being employed for pressing the timber into the mold,) without departing from the spirit of my invention.

*Claim.*

What I claim as my invention, and desire to secure by Letters Patent, is—

Connecting the links A of a chain for bending wood by one or more flexible ropes, B, substantially as set forth.

LEVI HEYWOOD.

Witnesses:
N. W. STEARNS,
P. E. TESCHEMACHER.